United States Patent
Kojima et al.

(10) Patent No.: US 12,421,156 B2
(45) Date of Patent: Sep. 23, 2025

(54) METHOD FOR MANUFACTURING OPTICAL FIBER GLASS PREFORM

(71) Applicant: Shin-Etsu Chemical Co., Ltd., Tokyo (JP)

(72) Inventors: Hiroki Kojima, Chiba (JP); Dai Inoue, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 285 days.

(21) Appl. No.: 17/855,821

(22) Filed: Jul. 1, 2022

(65) Prior Publication Data

US 2023/0023064 A1    Jan. 26, 2023

(30) Foreign Application Priority Data

Jul. 12, 2021  (JP) ................................ 2021-115313

(51) Int. Cl.
C03B 37/014    (2006.01)

(52) U.S. Cl.
CPC .. C03B 37/01446 (2013.01); C03B 37/01453 (2013.01); C03B 37/0148 (2013.01); C03B 2201/12 (2013.01); C03B 2201/31 (2013.01)

(58) Field of Classification Search
None
See application file for complete search history.

(56) References Cited

U.S. PATENT DOCUMENTS

| | | | | |
|---|---|---|---|---|
| 5,145,507 A | * | 9/1992 | Kyoto | C03B 37/01446 65/427 |
| 5,203,898 A | * | 4/1993 | Carpenter | C03B 37/01446 65/421 |
| 2002/0108404 A1 | * | 8/2002 | Burke | C03B 37/01446 65/422 |
| 2009/0272716 A1 | * | 11/2009 | Bookbinder | C03C 23/0075 216/24 |

(Continued)

FOREIGN PATENT DOCUMENTS

| | | | |
|---|---|---|---|
| EP | 1405830 A1 | 4/2004 | |
| JP | H03218935 A | 9/1991 | |
| JP | H04295025 A * | 10/1992 | ........... C03B 37/014 |

(Continued)

OTHER PUBLICATIONS

Office Action issued for counterpart Japanese Application No. 2022-098012, transmitted from the Japanese Patent Office on Apr. 22, 2025.

*Primary Examiner* — Cynthia Szewczyk (57) ABSTRACT

Provided is a method for manufacturing an optical fiber glass preform in which a refractive index distribution is stable in a longitudinal direction of the glass preform. A method for manufacturing an optical fiber glass preform includes: depositing a porous glass preform by a vapor phase method; and sintering the porous glass preform in a heating region, when sintering the porous glass preform, the porous glass preform being inserted into a vessel of a sintering furnace, and an inside of the vessel being heated with a heater installed on an outer periphery of the vessel to form (Continued)

the heating region. The sintering is started after a surface temperature difference of the porous glass preform in a longitudinal direction is made 50° C. or lower.

19 Claims, 8 Drawing Sheets

(56) References Cited

U.S. PATENT DOCUMENTS

| | | | |
|---|---|---|---|
| 2015/0038320 A1* | 2/2015 | Tomosue | D01F 9/08 501/153 |
| 2020/0283329 A1* | 9/2020 | Groh | C03B 37/01257 |

FOREIGN PATENT DOCUMENTS

| | | | | |
|---|---|---|---|---|
| JP | H05270850 A | * | 10/1993 | ........... C03B 37/014 |
| JP | H05279066 A | * | 10/1993 | ........... C03B 37/014 |
| JP | H0692648 A | | 4/1994 | |
| JP | 2000128563 A | * | 5/2000 | ......... C03B 37/0146 |
| JP | 2002047013 A | | 2/2002 | |
| JP | 2003335540 A | | 11/2003 | |
| JP | 2005320197 A | * | 11/2005 | ......... C03B 37/0146 |
| JP | 2006045020 A | * | 2/2006 | ......... C03B 37/0146 |
| JP | 2006131453 A | | 5/2006 | |
| WO | 02102725 A1 | | 12/2002 | |
| WO | WO-2004101457 A1 | * | 11/2004 | ....... C03B 37/01446 |

* cited by examiner

METHOD FOR MANUFACTURING OPTICAL FIBER GLASS PREFORM

The contents of the following Japanese patent application(s) are incorporated herein by reference:
NO. 2021-115313 filed in JP on Jul. 12, 2021

BACKGROUND

Technical Field

The present invention relates to a transparent vitrification treatment for dehydrating and sintering a porous glass preform, and particularly relates to a method for manufacturing an optical fiber glass preform having uniform characteristics in a longitudinal direction.

Description of the Prior Art

In order to manufacture an optical fiber glass preform, first, a porous glass preform is produced by various methods including a vapor-phase axial deposition method (VAD) and an outside vapor deposition method (OVD). The porous glass preform produced by these methods is formed by an aggregate of only glass fine particles or a deposit of glass fine particles on the outer periphery of a transparent glass rod. Thereafter, the porous glass preform undergoes a process of performing dehydration treatment by heating at 1000 to 1300° C. in a chlorine gas atmosphere, and is further heat-treated at 1400 to 1600° C. in a helium gas atmosphere, thereby obtaining a transparent optical fiber glass preform.

In the VAD method, a burner is disposed below a rotating vertical starting glass rod, a raw material gas is put into the oxyhydrogen flame formed by the burner, glass fine particles are generated by a flame hydrolysis reaction, and the generated glass fine particles are deposited in an axial direction of the starting rod to produce a porous glass preform. In the OVD method, for example, a burner is disposed on the outer periphery of a starting glass rod rotating in a reaction vessel, a raw material gas is put into the oxyhydrogen flame formed by the burner, glass fine particles are generated by a flame hydrolysis reaction, and the generated glass fine particles are deposited on the outer periphery of the starting glass rod to produce a porous glass preform.

In a general preform for a single-mode optical fiber, a high refractive index region called a core is formed in a central portion, and the core is often doped with Ge for increasing the refractive index of quartz glass. In addition, a clad is formed around the core. Generally, the glass preform is manufactured by a method of manufacturing a portion having a part of the clad around the core and applying the remaining clad on the outer side of the portion in two stages or also is manufactured in multiple stages by dividing the application of the clad into a plurality of times. Note that in the present invention, a glass preform having the core and a part of the clad or a glass preform having the core and the whole clad is also collectively referred to as a glass preform.

Figure 1A:
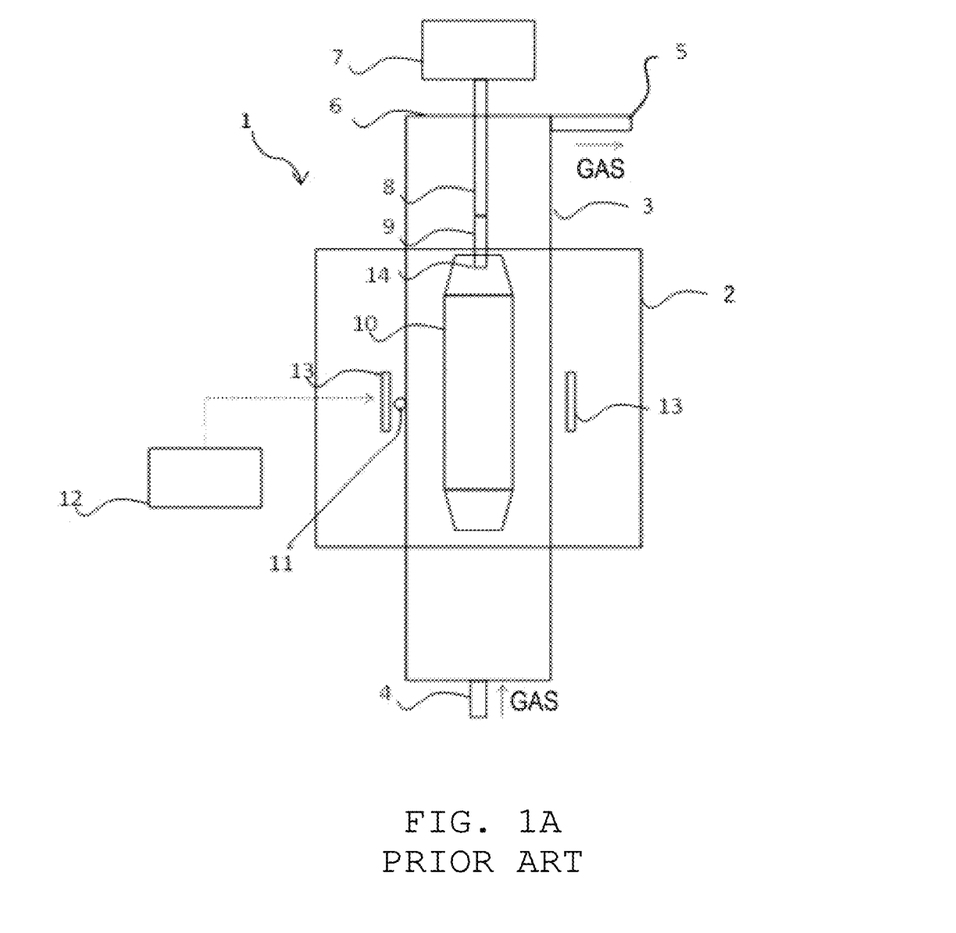
FIG. 1A is a schematic view illustrating a sintering furnace having a zone heating furnace.

The dehydration and transparent vitrification of the porous glass preform 10 are performed in a furnace core tube 3 formed of a heat resistant material such as carbon or quartz and a sintering furnace 1 in which a heater 13 is disposed on the outer periphery of the furnace core tube 3. Generally, the processing is performed while a lid 6 of the furnace core tube 3 is closed in a state where the porous glass preform 10 is inserted into the furnace core tube 3, and a gas is allowed to flow into the furnace core tube 3. When the sintering furnace (zone heating furnace) 1 illustrated in FIG. 1A is used, the porous glass preform 10 is raised, lowered, or raised and lowered repeatedly with respect to a heating region formed by the heater 13. The sintering furnace (zone heating furnace) 1 includes a furnace body 2, a furnace core tube 3, a lower gas introduction port 4, an upper gas exhaust port 5, the lid 6, a thermocouple 11, a temperature control device 12, and the heater 13. The porous glass preform 10 is supported by a suspension rod 8 via a dummy rod 9, and is moved up and down by a lifting device 7 connected to the suspension rod 8. The lower end of the dummy rod 9 biting into the porous glass preform 10 is defined as a dummy lower end 14. The dehydration treatment process is performed with the temperature of the heating region set to about 1200° C. in a mixed gas atmosphere in which a chlorine-based gas and an inert gas flow into the furnace core tube 3. The transparent vitrification process is performed with the temperature of the heating region set to about 1500° C.

Figure 1B:
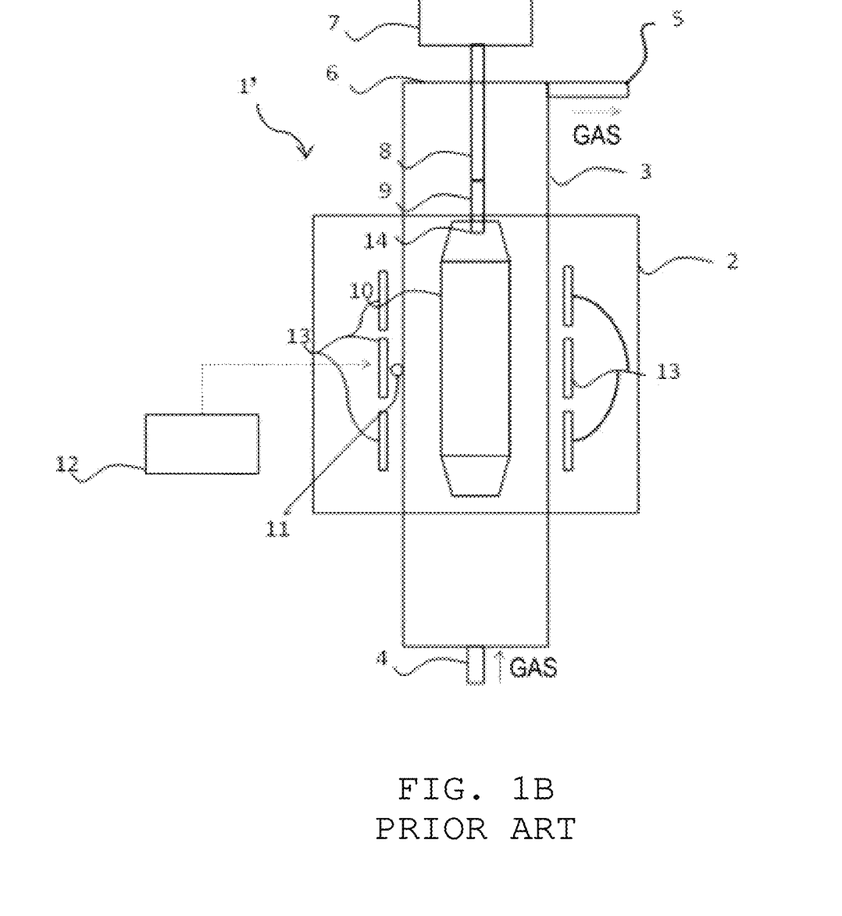
FIG. 1B is a schematic view illustrating a sintering furnace having a soaking furnace in which a plurality of heaters is arranged vertically.

When a sintering furnace (soaking furnace) 1' is used in which a plurality of heaters 13 is arranged vertically as illustrated in FIG. 1B, it is also possible to perform treatment without raising or lowering the porous glass preform 10. Patent Document 1 describes a technique for doping a porous glass preform with fluorine by heat-treating the porous glass preform in a fluorine compound gas atmosphere in a zone heating furnace.

Related Art

Patent Document 1: Japanese Patent Application Publication No. 2002-47013

When a transparent glass preform is produced by heat-treating the porous glass preform produced by the above-described method, the refractive index distribution of the glass preform fluctuates in a longitudinal direction, and the optical fiber produced from the glass preform has a problem that optical characteristics such as a cutoff wavelength fluctuate in the longitudinal direction. An object of the present invention is to provide a method for manufacturing an optical fiber glass preform in which a refractive index distribution is stable in a longitudinal direction of the glass preform.

GENERAL DISCLOSURE

A method for manufacturing an optical fiber glass preform according to the present invention includes: depositing a porous glass preform by a vapor phase method; and sintering the porous glass preform in a heating region, when sintering the porous glass preform, the porous glass preform being inserted into a vessel of a sintering furnace, and an inside of the vessel being heated with a heater installed on an outer periphery of the vessel to form the heating region. The sintering is started after a surface temperature difference of the porous glass preform in a longitudinal direction is made 50° C. or lower.

It is preferable that the porous glass preform is sintered while the heating region is moved along an axial direction of the porous glass preform. In addition, it is preferable that the sintering is performed after a minimum temperature of a surface of the porous glass preform is made 200° C. or lower. The sintering further includes: dehydrating by performing chlorine treatment; and vitrifying by performing transparent vitrification. A fluorine compound gas may be added to an atmosphere gas in the dehydrating, and it is preferable that the fluorine compound gas is any one of SiF4, CF4, SF6, and C2F6. In addition, it is preferable that the porous glass preform is doped with Ge.

A method for manufacturing an optical fiber glass preform according to the present invention includes: depositing a porous glass preform by a vapor phase method; and sintering the porous glass preform in a heating region, when sintering the porous glass preform, the porous glass preform being inserted into a vessel of a sintering furnace, and an inside of the vessel being heated with a heater installed on an outer periphery of the vessel to form the heating region. A time period from an end of the depositing the porous glass preform to a start of the sintering the porous glass preform in the heating region is set to 2.5 hours or more, more preferably 5 hours or more.

A method for manufacturing an optical fiber glass preform according to the present invention includes: depositing a porous glass preform by a vapor phase method; and sintering the porous glass preform in a heating region, when sintering the porous glass preform, the porous glass preform being inserted into a vessel of a sintering furnace, and an inside of the vessel being heated with a heater installed on an outer periphery of the vessel to form the heating region. A time period from the inserting the porous glass preform into the vessel of the sintering furnace to a start of the sintering the porous glass preform in the heating region is set to 1 hour or less, more preferably 0.5 hours or less.

According to the method for manufacturing an optical fiber glass preform of the present invention, a glass preform can be obtained in which a fluctuation (hereinafter, referred to as a longitudinal fluctuation) in a refractive index distribution in a longitudinal direction of the preform is small, and an optical fiber in which a longitudinal fluctuation of a cutoff wavelength or the like is small can be obtained from the preform.

DESCRIPTION OF EXEMPLARY EMBODIMENTS

Hereinafter, the present invention will be described in detail, but the present invention is not limited thereto, and various aspects are possible. In general, in an optical fiber glass preform, the refractive index of a core at an axial center is high, and the refractive index of a clad surrounding the core is low. In order to form such a refractive index distribution, germanium (Ge) may be used as a dopant for increasing the refractive index of the core, and fluorine (F) may be used as a dopant for decreasing the refractive index of the clad. The doping of Ge is performed by supplying a Ge-containing compound such as $GeCl_4$ to a burner to generate glass fine particles containing Ge and depositing the glass fine particles to form a porous glass preform in which Ge is doped in the core. In addition, the doping of F is performed, for example, by mixing a fluorine-containing gas with an atmosphere gas heated in the dehydration treatment process.

As a result of intensive studies, it has been found that, in the case of sintering the porous glass preform manufactured by the VAD or OVD, variations in operations and treatments from the manufacturing of the porous glass preform to the start of heat treatment in a sintering furnace affect the longitudinal fluctuation of the refractive index distribution of the preform in the longitudinal direction. Hereinafter, the variations in treatments and operations of the porous glass preform will be described in detail.

First, it is considered that the temperature distribution of the surface of the porous glass preform at the start of the heat treatment is related. That is, even when the temperature of the heater for heating the furnace core tube of the sintering furnace is kept constant, and the moving speed of the porous glass preform moving in the heating region is controlled to be constant, when a variation in temperature distribution in the longitudinal direction of the porous glass preform is large, the degree of heat treatment varies depending on the longitudinal position of the porous glass preform. In the dehydration treatment process, it is known that a part of Ge doped in the core of the porous glass preform reacts with chlorine in the atmosphere gas to change into volatile $GeCl_4$ or the like and volatilize. When the degree of heat treatment of the porous glass preform is different, the volatilization amount of Ge is also different, and this affects a variation in a refractive index distribution shape. In addition, it is known that when F doping is performed in the dehydration treatment process, an F doping rate generally tends to increase when the temperature increases. When the degree of heat treatment of the porous glass preform is different, the doping amount of F is also different, and this also affects the variation in the refractive index distribution shape.

When the porous glass preform is produced by the VAD method, the porous glass preform is produced by starting from the starting rod and depositing glass fine particles generated by the burner from the upper portion toward the lower portion in the axial direction. When the production of the porous glass preform is ended, that is, when the deposition of the glass fine particles ejected from the burner is ended, and the straight body portion of the porous glass preform is separated from the flame irradiation of the deposition burner, a long time has elapsed since the burner flame hit the upper deposition portion formed in the initial stage of the straight body portion of the porous glass preform, but a short time has elapsed since the burner flame hit the lower deposition portion, and thus a large temperature difference is generated between the upper portion and the lower portion of the straight body portion of the preform. For example, the surface temperature of the upper portion of the porous glass preform immediately after the end of the deposition is about 30° C., but the lower portion of the porous glass preform may exceed 200° C.

Therefore, when the porous glass preform immediately after being produced by the VAD method is stored in the sintering furnace, and a sintering gas is flowed into the furnace core tube to start the dehydration treatment, the longitudinal fluctuation of the refractive index distribution of the preform is likely to occur. Therefore, it is desirable that when the porous glass preform is stored in the sintering furnace, the sintering gas starts to flow in the furnace core tube, and the treatment is started, the surface temperature difference in the longitudinal direction of the straight body portion of the porous glass preform is 50° C. or lower. When the surface temperature difference exceeds 50° C., even when sintering is performed under the same temperature and gas conditions at the time of sintering, the refractive index distribution shape varies depending on the differences in the doping amount of fluorine and the doping amount of Ge between a portion with a high temperature and a portion with a low temperature, and as a result, in the optical fiber produced from such a glass preform, optical characteristics such as a MFD fluctuate in the longitudinal direction.

Figure 2:
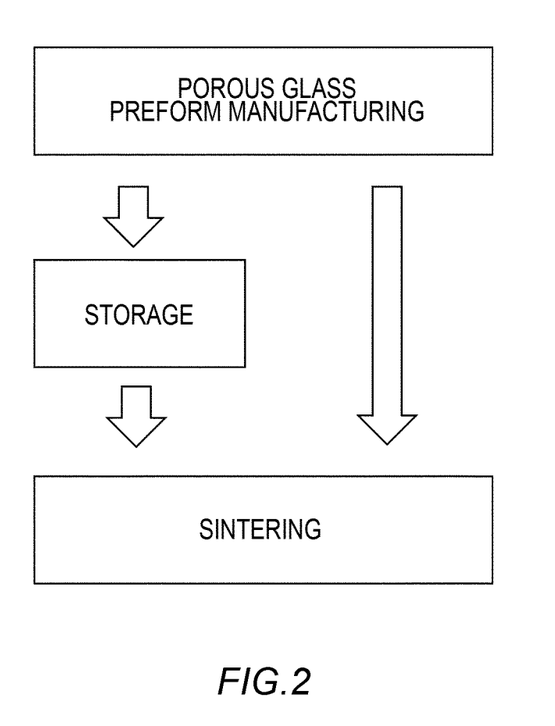
FIG. 2 is a diagram illustrating a comparison between a method of directly moving a porous glass preform after completion of deposition into a sintering furnace (right side in the drawing) and a method of temporarily storing the porous glass preform in a storage to equalize the temperature of the porous glass preform and then moving the porous glass preform into the sintering furnace (left side in the drawing).

By placing the porous glass preform manufactured by the VAD method under an atmosphere with a stable temperature for a certain period of time, the temperature of the porous glass preform can be lowered, and at the same time, the temperature difference in the longitudinal direction of the preform can be reduced. It is sufficient if the ambient temperature at this time is made equal to or lower than the surface temperature of the upper portion of the porous glass preform immediately after the end of the deposition, for example, to the room temperature of 25° C. to cool the porous glass preform, and natural cooling, rapid cooling by applying cold air, or the like is also conceivable. Alternatively, the porous glass preform may be heated to a temperature equal to or higher than the surface temperature of the upper portion of the porous glass preform, or the porous glass preform may be heated with hot air or a heater to reduce the temperature difference in the longitudinal direction of the porous glass preform. Note that when heating is performed to an excessively high temperature, the volatilization amount of Ge during sintering increases, and the doping efficiency is reduced. Thus, it is preferable to start to allow the sintering gas to flow after the minimum temperature of the surface of the porous glass preform straight body portion is made 200° C. or lower. Accordingly, the fluorine doping amount and the Ge volatilization amount during sintering can be suppressed from changing in the longitudinal direction. In this regard, instead of directly moving the porous glass preform with the deposition ended to the sintering furnace as illustrated on the right side of FIG. 2, it is preferable to temporarily store the porous glass preform in a storage illustrated on the left side of FIG. 2 in which the atmosphere is managed and hold the porous glass preform in a clean and low-humidity atmosphere to equalize the temperature of the porous glass preform in the longitudinal direction. Accordingly, it is possible to simultaneously suppress adhesion of foreign matters to the surface of the porous glass preform and moisture absorption, which is preferable.

Since the porous glass preform temporarily stored in the sintering furnace is exposed to the heater or radiant heat from the inner wall of the furnace core tube heated by the heater, the temperature on the side close to the heating region may gradually increase. Therefore, when the sintering gas is allowed to flow to start the dehydration treatment after the porous glass preform is left in the sintering furnace for a long time, the fluctuation of the refractive index distribution in the longitudinal direction of the preform is likely to occur. Therefore, when the porous glass preform temporarily stored in the sintering furnace starts the raising/lowering operation to the heating region as quickly as possible, it is possible to prevent that the temperature on the side close to the heating region at the time of storage increases excessively, and the refractive index distribution shape of the preform in the longitudinal direction is stabilized.

The longitudinal fluctuation of the refractive index distribution can be suppressed and the longitudinal fluctuation of the optical characteristics can be suppressed by lengthening a time period from the end (when the deposition of the glass fine particles ejected from the burner is ended, and the straight body portion of the porous glass preform is separated from the flame irradiation of the deposition burner) of the production of the porous glass preform to the start of sintering. That is, it is preferable that the time period from the end of the deposition of the porous glass preform and the separation of the porous glass preform from the flame irradiation of the deposition burner to the input of the porous glass preform into the furnace core tube and the start of flow of the sintering gas is set to 2.5 hours or more. It is more preferable that the time period is 5 hours or more. In addition, the longitudinal fluctuation can also be suppressed by shortening a time period from putting the porous glass in the sintering vessel to the start of sintering. It is desirable that the time period from putting the porous glass in the sintering vessel to the start of sintering is within 1 hour. It is more preferable that the time period is within 0.5 hours.

EXAMPLES

Examples 1 and 2 and Comparative Examples 1 and 2

Example 1

A porous glass preform having a total length of 2000 mm was manufactured by the VAD method. Thereafter, a porous glass preform 10 was naturally cooled for 24 hours and sintered by using a sintering furnace 1 having a heater length of 300 mm. Before the start of sintering after natural cooling, the surface temperature difference of the porous glass preform 10 in the longitudinal direction was 20° C. In FIGS. 3A to 3E, a positional relationship between a heater 13 and the porous glass preform 10 is illustrated. First, in a state where the porous glass preform 10 was caused to stand by at the upper end of the sintering furnace 1 (FIG. 3A), a mixed gas composed of $Cl_2$: 0.7 L/min, Ar: 30 L/min, and $SiF_4$ gas: 0.1 L/min was allowed to flow into the sintering furnace 1, a temperature was simultaneously raised, and the temperature was controlled to 1300° C. Thereafter, the porous glass preform 10 was moved from the upper side toward the lower side at a speed of 10 mm/min (FIG. 3B), and a fluorine doping and dehydrating process is performed. The porous glass preform 10 was lowered to a predetermined position, a He gas was introduced into the sintering furnace 1 at 20 L/min, and the porous glass preform 10 was pulled up to the upper end of the sintering furnace 1 (FIG. 3C). Thereafter, the temperature was raised, the temperature was controlled to 1500° C., and the porous glass preform 10 was moved downward from the upper end of the sintering furnace 1 at a speed of 5 mm/min (FIG. 3D). When the porous glass preform 10 was lowered to a desired position, and a vitrification process was ended, the transparent porous glass preform 10 was pulled up (FIG. 3E). Regarding the cutoff wavelength after sintering, a numerical difference (maximum value–minimum value) in the longitudinal direction of the porous glass preform 10 was 1 nm, and an average MFD was 9.15 µm.

Example 2

The porous glass preform 10 having a total length of 2000 mm was manufactured by the VAD method. Thereafter, the porous glass preform 10 was naturally cooled for 12 hours, and then sintered in a soaking furnace 1' having a heater length of 1300 mm. Before the start of sintering, the surface temperature difference of the porous glass preform 10 in the longitudinal direction was 40° C. A mixed gas composed of $Cl_2$: 0.7 L/min, Ar: 30 L/min, and $SiF_4$ gas: 0.1 L/min was allowed to flow into the soaking furnace 1'. At the same time, the temperature was raised, the temperature was controlled to 1300° C., and heating was performed for 4 hours to perform the fluorine doping and dehydrating process. Thereafter, a He gas was introduced into the soaking furnace 1' at 20 L/min, and the temperature was raised to control the temperature to 1500° C., thereby transparently vitrifying the porous glass preform 10. Regarding the cutoff wavelength after sintering, the numerical difference (maximum value–minimum value) in the longitudinal direction of the porous glass preform 10 was 2 nm, and the average MFD was 9.16 µm.

Comparative Example 1

Figure 3A:
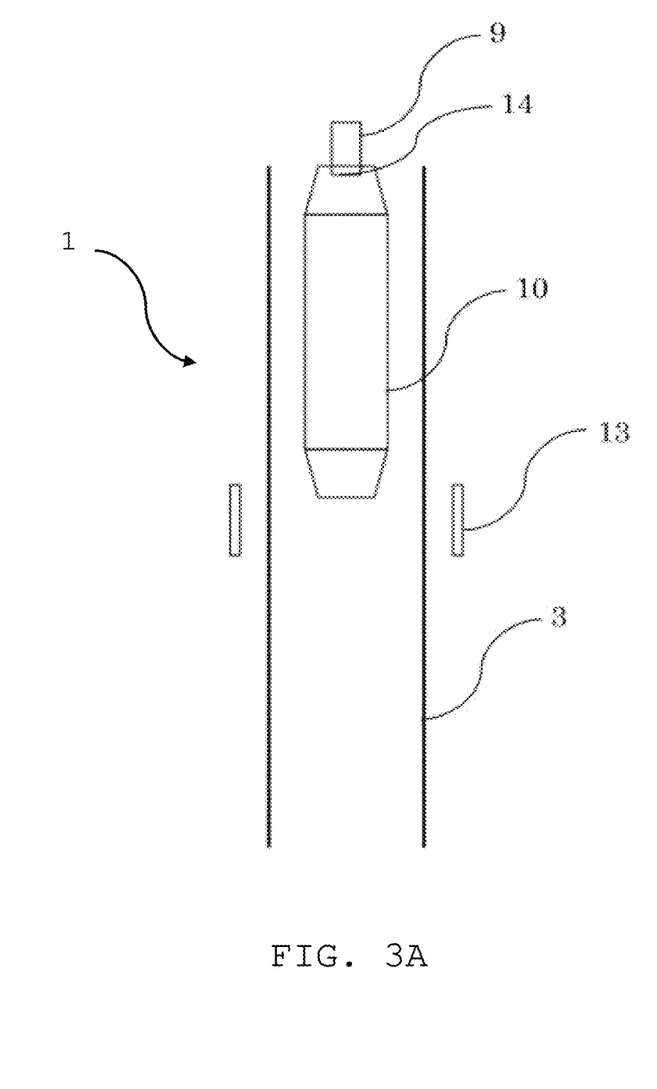
FIG. 3A is a schematic view illustrating a positional relationship between a heater and the porous glass preform in the sintering furnace.
Figure 3B:
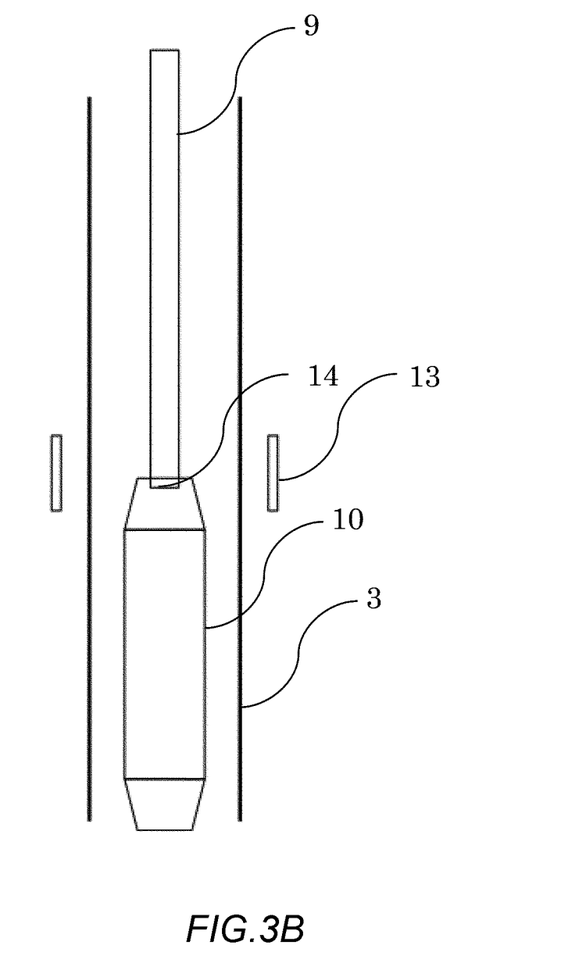
FIG. 3B is a schematic view illustrating a positional relationship between the heater and the porous glass preform in the sintering furnace.
Figure 3C:
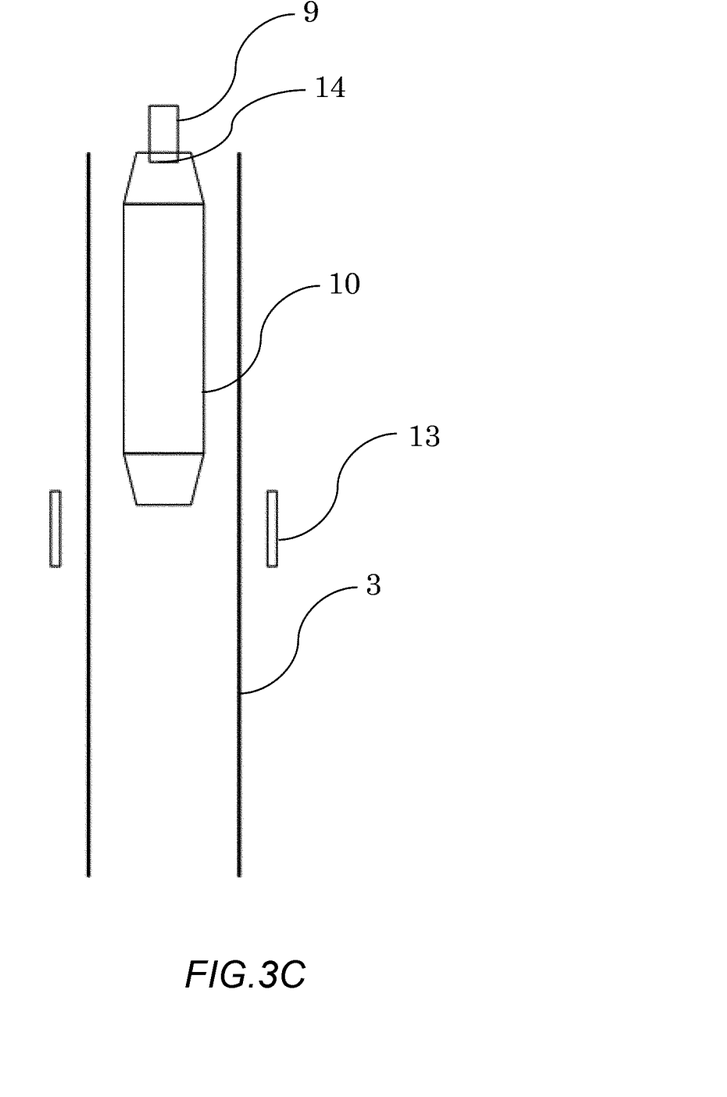
FIG. 3C is a schematic view illustrating a positional relationship between the heater and the porous glass preform in the sintering furnace.
Figure 3D:
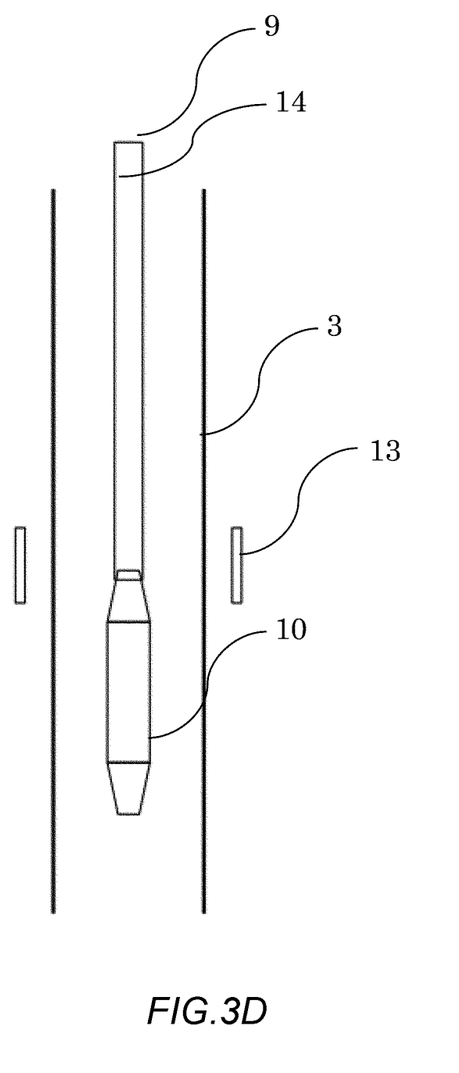
FIG. 3D is a schematic view illustrating a positional relationship between the heater and the porous glass preform in the sintering furnace.
Figure 3E:
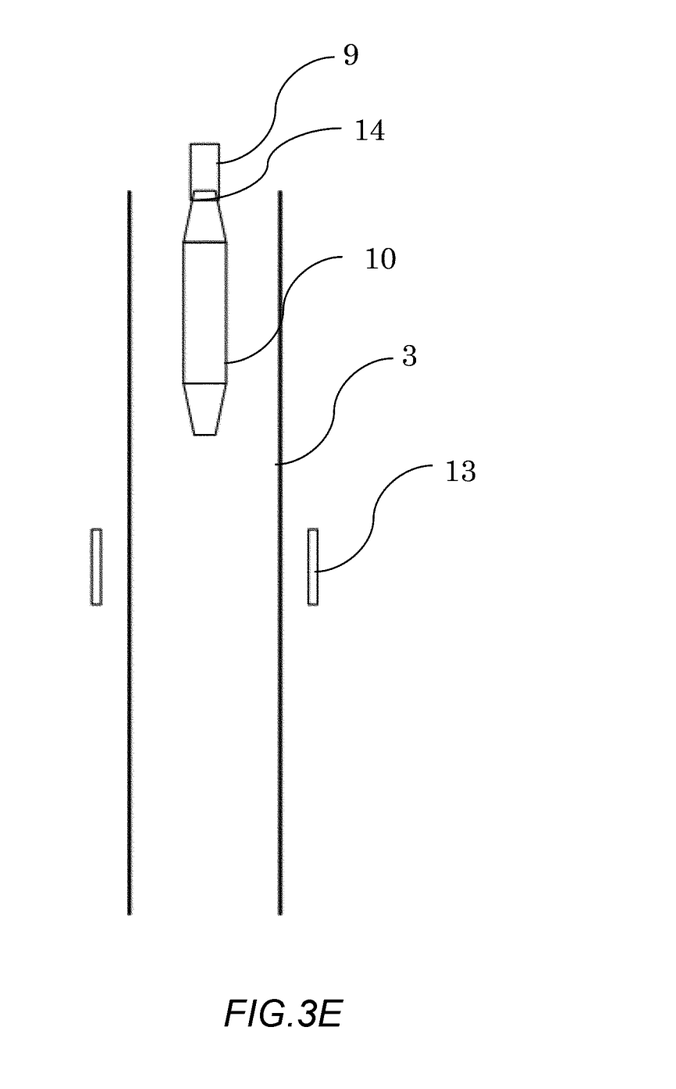
FIG. 3E is a schematic view illustrating a positional relationship between the heater and the porous glass preform in the sintering furnace.

The porous glass preform 10 having a total length of 2000 mm was manufactured by the VAD method Immediately after the manufacturing, the porous glass preform was put in the sintering furnace 1 having a heater length of 300 mm, and left for 3 hours before the start of sintering in the state of FIG. 3A. Before the start of sintering, the surface temperature difference of the porous glass preform 10 in the longitudinal direction was 300° C. Thereafter, sintering was performed similarly to Example 1. Regarding the cutoff wavelength after sintering, the numerical difference (maximum value–minimum value) in the longitudinal direction of the porous glass preform 10 was 30 nm, and the average MFD was 9.25 µm.

Comparative Example 2

The porous glass preform 10 having a total length of 2000 mm was manufactured by the VAD method. Thereafter, the porous glass preform was naturally cooled for 12 hours. Thereafter, the porous glass preform 10 was put in the soaking furnace 1' having a heater length of 1300 mm, and left for 3 hours before the start of sintering. The surface temperature difference of the porous glass preform 10 in the longitudinal direction before the start of sintering was 40° C., but there was a place where the minimum temperature of the porous glass preform 10 reached 260° C. Thereafter, sintering was performed similarly to Example 1. Regarding the cutoff wavelength after sintering, the numerical difference (maximum value–minimum value) in the longitudinal direction of the porous glass preform 10 was 5 nm, and the average MFD was 9.34 µm. The conditions and characteristics of Examples 1 and 2 and Comparative Examples 1 and 2 are summarized in Table 1.

TABLE 1

| | FURNACE STRUCTURE | MINIMUM LONGITUDINAL SURFACE TEMPERATURE [° C.] | MAXIMUM LONGITUDINAL SURFACE TEMPERATURE [° C.] | LONGITUDINAL SURFACE TEMPERATURE DIFFERENCE [° C.] | CUTOFF LENGTH DIFFERENCE [nm] | AVERAGE MFD [mM] |
|---|---|---|---|---|---|---|
| EXAMPLE 1 | ZONE FURNACE | 30 | 50 | 20 | 1 | 9.15 |
| EXAMPLE 2 | SOAKING FURNACE | 50 | 90 | 40 | 2 | 9.16 |
| COMPARATIVE EXAMPLE 1 | ZONE FURNACE | 100 | 400 | 300 | 30 | 9.25 |
| COMPARATIVE EXAMPLE 2 | SOAKING FURNACE | 220 | 260 | 40 | 5 | 9.34 |

When the temperature difference of the porous glass preform 10 in the longitudinal direction before the start of sintering is small as in Examples 1 and 2, the fluorine doping amount can be made uniform in the longitudinal direction, and the volatilization amount of Ge is also made uniform. As a result, the fluctuation in optical characteristics in the longitudinal direction can be suppressed. The result was similar in both the sintering furnace 1 (Example 1) having a zone heating furnace and the sintering furnace 1' (Example 2) having a soaking furnace. On the other hand, when the surface temperature difference the porous glass preform 10 in the longitudinal direction of before the start of sintering was large as in Comparative Example 1, the fluorine doping amount and the Ge volatilization amount of the porous glass preform 10 in the longitudinal direction were non-uniform, and the fluctuation in optical characteristics in the longitudinal direction is large. Therefore, in the present invention, the sintering is started after the surface temperature difference of the porous glass preform 10 in the longitudinal direction is made 50° C. or lower.

In Comparative Example 2, the surface temperature difference in the longitudinal direction before the start of sintering was small, but the minimum temperature of the surface of the porous glass preform 10 before the start of sintering exceeded 200° C. in some places, and the volatilization of Ge easily proceeded during sintering, so that the MFD increased. Therefore, it is preferable to perform sintering after the minimum temperature of the surface of the porous glass preform is made 10 to 200° C. or lower. Since the volatilization of Ge also relates to the porous glass preform 10 which is not doped with fluorine, the fluctuation in optical characteristics in the longitudinal direction can be suppressed by applying the conditions of the present invention. In addition, in both of a case where fluorine is uniformly doped in a radial direction and a case where there is a concentration difference in fluorine in the radial direction, the fluctuation in optical characteristics in the longitudinal direction can be suppressed by applying the conditions of the present invention. In addition, by managing the surface temperature, the operation becomes considerably easy as compared with the case of managing the inside of the porous glass, and the conditions of the present invention can be applied to all products.

Examples 3 to 6 and Comparative Example 3

The porous glass preform 10 having a total length of 2000 mm was manufactured by the VAD method. Thereafter, sintering was performed in the sintering furnace 1 having a heater length of 300 mm. FIGS. 3A to 3E illustrate the positional relationship between the heater 13 and the porous glass preform 10. First, in a state where the porous glass preform 10 was caused to stand by at the upper end of the sintering furnace as illustrated in FIG. 3A, a mixed gas of Cl2: 0.7 L/min, Ar: 30 L/min, and $SiF_4$ gas: 0.1 L/min was allowed to flow into the furnace, the temperature was simultaneously raised, and the temperature was controlled to 1300° C. Thereafter, the porous glass preform 10 was moved from the upper side toward the lower side at a speed of 10 mm/min (FIG. 3B), and a fluorine doping and dehydrating process is performed. When the porous glass preform 10 was lowered to a desired position, a He gas was introduced into the sintering furnace 1 at 20 L/min, and at the same time, the porous glass preform was pulled up to the upper end (FIG. 3C). Thereafter, the temperature was raised, the temperature was controlled to 1500° C., and the porous glass preform 10 was moved downward from the upper end at a speed of 5 mm/min (FIG. 3D). When the porous glass preform 10 was lowered to the desired position, and the vitrification process was ended, the transparent porous glass preform 10 was pulled up (FIG. 3E). At this time, the porous glass preform 10 was manufactured with a time period from the end of manufacturing of the porous glass preform 10 by the VAD method to the start of sintering set to 28.3 hours in Example 3, the time period set to 5 hours in Example 4, the time period set to 3 hours in Example 5, the time period set to 2.5 hours in Example 6, and the time period set to 1.9 hours in Comparative Example 3. In Examples 3 to 6 and Comparative Example 3, the time period from putting the porous glass preform 10 in the sintering vessel to the start of sintering was uniformly set to 1 hour. Table 2 shows the results of Examples 3 to 6 and Comparative Example 3.

TABLE 2

|  | TIME PERIOD FROM END OF VAD TO START OF SINTERING [h] | CUTOFF LENGTH DIFFERENCE [nm] |
| --- | --- | --- |
| EXAMPLE 3 | 28.3 | 0.0 |
| EXAMPLE 4 | 5 | 8.6 |
| EXAMPLE 5 | 3 | 15.8 |
| EXAMPLE 6 | 2.5 | 23.6 |
| COMPARATIVE EXAMPLE 3 | 1.9 | 28.0 |

In Examples 3 and 4 in which the time period from the end of manufacturing by the VAD method to the start of sintering was 5 hours or more, the fluctuation in the cutoff wavelength in the longitudinal direction of the preform was small. On the other hand, it can be seen from Table 2 that in Examples 5 and 6 in which the time period is shorter than 5 hours, the fluctuation in the cutoff wavelength in the longitudinal direction is larger than in Examples 3 and 4, and in Comparative Example 3 in which the time period is shorter than 2.5 hours, the fluctuation in the cutoff wavelength is remarkably large. This is considered to be because in Comparative Example 3, the temperature on a VAD end side in the longitudinal direction of the porous glass preform 10 is high, and there is a large temperature difference from a start side, so that when the time period until the start of sintering is short, the preform is not sufficiently cooled, and the equalization of the temperature of the preform cannot be sufficiently performed. When the numerical difference (cutoff length difference) in the cutoff wavelength in the longitudinal direction of the preform is large, there is a possibility that a region that does not fall within the standard value of the product may appear. Therefore, in the present invention, the time period from the end of the process of depositing the porous glass preform to the start of the process of sintering the porous glass preform in the heating region is set to 2.5 hours or more, more preferably 5 hours or more.

Examples 7 to 10 and Comparative Example 4

A porous glass preform having a total length of 2000 mm was manufactured by the VAD method. Thereafter, sintering was performed in the sintering furnace 1 having a heater length of 300 mm. First, in a state where the porous glass preform 10 was caused to stand by at the upper end as illustrated in FIG. 3A, a mixed gas composed of Cl2: 0.7 L/min, Ar: 30 L/min, and $SiF_4$ gas: 0.1 L/min was allowed to flow into the sintering furnace 1, the temperature was simultaneously raised, and the temperature was controlled to 1300° C. Thereafter, the porous glass preform 10 was moved from the upper side toward the lower side at a speed of 10 mm/min (FIG. 3B), and a fluorine doping and dehydrating process is performed. The porous glass preform 10 was lowered to a desired position, a He gas was introduced into the sintering furnace 1 at 20 L/min, and the porous glass preform 10 was pulled up to the upper end of the sintering furnace 1 (FIG. 3C). Thereafter, the temperature was raised, the temperature was controlled to 1500° C., and the porous glass preform 10 was moved downward from the upper end of the sintering furnace 1 at a speed of 5 mm/min (FIG. 3D). When the porous glass preform 10 was lowered to the desired position, and the vitrification process was ended, the transparent porous glass preform 10 was pulled up (FIG. 3E). At this time, the glass preform was manufactured with the time period from putting the porous glass preform in the sintering furnace to the start of sintering set to 0.4 hours in Example 7, the time period set to 0.5 hours in Example 8, the time period set to 0.8 hours in Example 9, the time period set to 1.0 hour in Example 10, and the time period set to 1.9 hours in Comparative Example 4. In Examples 7 to 10 and Comparative Example 4, the time period from the end of manufacturing of the porous glass preform 10 by the VAD method to the start of sintering was uniformly set to 5 hours. Table 3 shows the results of Examples 7 to 10 and Comparative Example 4.

TABLE 3

|  | TIME PERIOD FROM PUTTING IN SINTERING FURNACE TO START OF SINTERING [h] | CUTOFF LENGTH DIFFERENCE [nm] |
| --- | --- | --- |
| EXAMPLE 7 | 0.4 | 0.0 |
| EXAMPLE 8 | 0.5 | 0.2 |
| EXAMPLE 9 | 0.8 | 17.0 |
| EXAMPLE 10 | 1.0 | 19.4 |
| COMPARATIVE EXAMPLE 4 | 1.9 | 32.4 |

In Examples 7 and 8 in which the time period from putting in the sintering furnace to the start of sintering is 0.5 hours or less, the fluctuation in the cutoff wavelength in the longitudinal direction of the preform is small. On the other hand, it can be seen from Table 3 that compared with Examples 6 and 7, the fluctuation in the cutoff wavelength is large in Examples 9 and 10 in which the time period is longer than 0.5 hours and is remarkably large in Comparative Example 4 in which the time period is longer than 1 hour. The result of Comparative Example 4 is considered to have occurred since the VAD end side was heated in the longitudinal direction of the porous glass preform 10, and a large temperature difference from the start side was generated. When the numerical difference in the cutoff wavelength in the longitudinal direction of the preform is large, there is a possibility that a region that does not fall within the standard value of the product may appear. Therefore, in the present invention, the time period from the insertion of the porous glass preform into the vessel of the sintering furnace to the start of the process of sintering the porous glass preform in the heating region is set to 1 hour or less, more preferably 0.5 hours or less.

The operation of lowering the porous glass preform 10 and putting the porous glass preform in the sintering vessel is automatically performed, and then a manual operation such as closing the lid 6 or connecting pipes is performed before starting sintering. Since the above-described operation performed automatically takes time, an operator generally performs another operation during that time, and the time period from putting in the sintering vessel to the start of sintering tends to be long. In order to keep the time period within 1 hour or 0.5 hours, it is necessary to perform the operation efficiently without any interval.

What is claimed is:

1. A method for manufacturing an optical fiber glass preform, the method comprising:
   depositing a porous glass preform by a vapor phase method;
   placing the porous glass preform in a storage immediately after the end of the depositing under a clean atmosphere with a stable temperature for a period of time until a surface temperature difference of the porous glass preform in a longitudinal direction is made 50° C. or lower, and a minimum temperature of a surface of the porous glass preform is made 200° C. or lower and not lower than about 30° C.; and
   sintering the porous glass preform in a heating region, when sintering the porous glass preform, the porous glass preform being inserted into a vessel of a sintering furnace, and an inside of the vessel being heated with a heater installed on an outer periphery of the vessel to form the heating region, wherein
   when the sintering is started, the surface temperature difference of the porous glass preform in the longitudinal direction is 50° C. or lower, and wherein when the sintering is started, the minimum temperature of the surface of the porous glass preform is 200° C. or lower and not lower than about 30° C.

2. The method for manufacturing the optical fiber glass preform according to claim 1, wherein the porous glass preform is sintered while the heating region is moved along an axial direction of the porous glass preform.

3. The method for manufacturing the optical fiber glass preform according to claim 2, wherein the sintering further includes: dehydrating by performing chlorine treatment; and vitrifying by performing transparent vitrification.

4. The method for manufacturing the optical fiber glass preform according to claim 2, wherein the porous glass preform is doped with Ge.

5. The method for manufacturing the optical fiber glass preform according to claim 1, wherein the sintering further includes: dehydrating by performing chlorine treatment; and vitrifying by performing transparent vitrification.

6. The method for manufacturing the optical fiber glass preform according to claim 5, wherein a fluorine compound gas is added to an atmosphere gas in the dehydrating.

7. The method for manufacturing the optical fiber glass preform according to claim 6, wherein the fluorine compound gas is any one of SiF4, CF4, SF6, and C2F6.

8. The method for manufacturing the optical fiber glass preform according to claim 7, wherein the porous glass preform is doped with Ge.

9. The method for manufacturing the optical fiber glass preform according to claim 6, wherein the porous glass preform is doped with Ge.

10. The method for manufacturing the optical fiber glass preform according to claim 5, wherein the porous glass preform is doped with Ge.

11. The method for manufacturing the optical fiber glass preform according to claim 1, wherein the porous glass preform is doped with Ge.

12. The method for manufacturing the optical fiber glass preform according to claim 1, wherein the time from the porous glass preform being inserted into the vessel of the sintering furnace to the sintering being started is one hour or less.

13. The method for manufacturing the optical fiber glass preform according to claim 1, wherein the time from the porous glass preform being inserted into the vessel of the sintering furnace to the sintering being started is a half hour or less.

14. A method for manufacturing an optical fiber glass preform, the method comprising:
   depositing a porous glass preform by a vapor phase method;
   placing the porous glass preform in a storage immediately after the end of the depositing under a clean atmosphere with a stable temperature for a period of time until a surface temperature difference of the porous glass preform in a longitudinal direction is made 50° C. or lower, and a minimum temperature of a surface of the porous glass preform is made 200° C. or lower; and
   sintering the porous glass preform in a heating region, when sintering the porous glass preform, the porous glass preform being inserted into a vessel of a sintering furnace, and an inside of the vessel being heated with a heater installed on an outer periphery of the vessel to form the heating region, wherein
   when the sintering is started, the surface temperature difference of the porous glass preform in the longitudinal direction is about 20° C., and wherein when the sintering is started, the minimum temperature of the surface of the porous glass preform in the longitudinal direction is about 30° C. and a maximum temperature of the surface of the porous glass preform in the longitudinal direction is about 50° C.

15. The method for manufacturing the optical fiber glass preform according to claim 14, wherein the time from the porous glass preform being inserted into the vessel of the sintering furnace to the sintering being started is one hour or less.

16. The method for manufacturing the optical fiber glass preform according to claim 14, wherein the time from the porous glass preform being inserted into the vessel of the sintering furnace to the sintering being started is a half hour or less.

17. A method for manufacturing an optical fiber glass preform, the method comprising:
depositing a porous glass preform by a vapor phase method;
placing the porous glass preform in a storage immediately after the end of the depositing under a clean atmosphere with a stable temperature for a period of time until a surface temperature difference of the porous glass preform in a longitudinal direction is made 50° C. or lower, and a minimum temperature of a surface of the porous glass preform is made 200° C. or lower; and
sintering the porous glass preform in a heating region, when sintering the porous glass preform, the porous glass preform being inserted into a vessel of a sintering furnace, and an inside of the vessel being heated with a heater installed on an outer periphery of the vessel to form the heating region, wherein
when the sintering is started, the surface temperature difference of the porous glass preform in the longitudinal direction is about 40° C., and wherein when the sintering is started, the minimum temperature of the surface of the porous glass preform in the longitudinal direction is about 50° C. and a maximum temperature of the surface of the porous glass preform in the longitudinal direction is about 90° C.

18. The method for manufacturing the optical fiber glass preform according to claim 17, wherein the time from the porous glass preform being inserted into the vessel of the sintering furnace to the sintering being started is one hour or less.

19. The method for manufacturing the optical fiber glass preform according to claim 17, wherein the time from the porous glass preform being inserted into the vessel of the sintering furnace to the sintering being started is a half hour or less.

* * * * *